United States Patent
Ghinamo et al.

(10) Patent No.: US 10,762,349 B2
(45) Date of Patent: Sep. 1, 2020

(54) SYSTEM FOR GENERATING 3D IMAGES FOR IMAGE RECOGNITION BASED POSITIONING

(71) Applicants: TELECOM ITALIA S.p.A., Milan (IT); POLITECNICO DI TORINO, Turin (IT)

(72) Inventors: Giorgio Ghinamo, Turin (IT); Andrea Maria Lingua, Turin (IT)

(73) Assignees: TELECOM ITALIA S.p.A., Milan (IT); POLITECNICO DI TORINO, Turin (IT)

( * ) Notice: Subject to any disclaimer, the term of this patent is extended or adjusted under 35 U.S.C. 154(b) by 140 days.

(21) Appl. No.: 16/062,306

(22) PCT Filed: Dec. 30, 2015

(86) PCT No.: PCT/EP2015/081455
§ 371 (c)(1),
(2) Date: Jun. 14, 2018

(87) PCT Pub. No.: WO2017/114581
PCT Pub. Date: Jul. 6, 2017

(65) Prior Publication Data
US 2018/0373933 A1    Dec. 27, 2018

(51) Int. Cl.
*G06K 9/00* (2006.01)
*G06T 7/73* (2017.01)
(Continued)

(52) U.S. Cl.
CPC ..... *G06K 9/00664* (2013.01); *G06F 16/3328* (2019.01); *G06F 16/56* (2019.01);
(Continued)

(58) Field of Classification Search
CPC .... G06K 9/00664; G06K 9/52; G06K 9/6215; G06K 9/6211; G06K 9/6203; G06K 9/46;
(Continued)

(56) References Cited

U.S. PATENT DOCUMENTS

| | | | |
|---|---|---|---|
| 2013/0155058 A1* | 6/2013 | Golparvar-Fard | G06T 19/006 345/419 |
| 2013/0188841 A1* | 7/2013 | Pollock | G01C 11/02 382/108 |

(Continued)

FOREIGN PATENT DOCUMENTS

| | | |
|---|---|---|
| EP | 2 711 670 A1 | 3/2014 |
| WO | WO 2012/100829 A1 | 8/2012 |

OTHER PUBLICATIONS

Richard A. Newcombe, et al., "DTAM: Dense Tracking and Mapping in Real-Time," IEEE International Conference on Computer Vision (ICCV), Nov. 6, 2011, XP032101466, pp. 2320-2327.

(Continued)

*Primary Examiner* — Jose L Couso
(74) *Attorney, Agent, or Firm* — Oblon, McClelland, Maier & Neustadt, L.L.P.

(57) ABSTRACT

A method positioning user equipment including a camera for acquiring digital images, including: defining a three-dimensional model of an environment through points defined by a set of coordinates and a color information; the user equipment acquiring a query image by capturing, by the camera, a portion of the environment; estimating an initial camera parameters configuration of the camera; evaluating a similarity between the query image and an initial three-dimensional image obtained from the three-dimensional model of the environment as seen by a virtual camera having the initial camera parameters configuration; modifying a camera parameters configuration of the virtual camera to increase similarity between the initial three-dimensional image and (Continued)

the query image up to a predetermined value; and generating an additional three-dimensional image based on the three-dimensional model of the environment, obtained from the three-dimensional model of the environment as seen by a modified virtual camera having the modified camera parameters configuration.

16 Claims, 3 Drawing Sheets

(51) Int. Cl.
    *G06T 7/33*         (2017.01)
    *G06K 9/62*         (2006.01)
    *G06T 19/00*       (2011.01)
    *G06F 16/56*       (2019.01)
    *G06F 16/332*     (2019.01)

(52) U.S. Cl.
    CPC ............ *G06K 9/6211* (2013.01); *G06T 7/337* (2017.01); *G06T 7/74* (2017.01); *G06T 7/75* (2017.01); *G06T 19/006* (2013.01); *G06T 2207/30244* (2013.01)

(58) Field of Classification Search
    CPC ........ G06K 9/6202; G06T 2207/30244; G06T 2207/10028; G06T 7/74; G06T 7/50; G06T 7/337; G06T 7/70; G06T 7/75; G06T 7/0044; G06T 7/0046; G06T 7/73; G06T 7/11; G06T 19/006; G06T 3/00; G06T 3/0093; G06T 15/06; G06T 15/20; G06T 15/205; G06T 17/00; G06T 17/10; G06T 2210/36; G06T 2210/04; G01C 21/206; G01C 11/02; G01C 11/00; G01C 11/06; G01C 11/12; G01C 11/26; G06F 16/3328; G06F 16/50; G06F 16/56; G06F 16/532; G06F 16/5838; G01S 17/48; G01S 7/4817; H04N 13/239; H04N 13/246; H04N 2013/0081

See application file for complete search history.

(56) References Cited

U.S. PATENT DOCUMENTS

| | | |
|---|---|---|
| 2014/0037140 A1 | 2/2014 | Benhimane et al. |
| 2015/0243080 A1 | 8/2015 | Steinbach et al. |
| 2018/0176483 A1* | 6/2018 | Knorr .................. G06T 19/006 |
| 2018/0330504 A1* | 11/2018 | Karlinsky ........... G06F 16/5838 |
| 2019/0108396 A1* | 4/2019 | Dal Mutto ......... G06K 9/00771 |
| 2019/0325089 A1* | 10/2019 | Golparvar-Fard .......................... G06Q 10/0633 |

OTHER PUBLICATIONS

Robert Huitl, et al., "Virtual Reference View Generation for CBIR-based Visual Pose Estimation," Proceedings of the 20$^{th}$ ACM International Conference on Multimedia, MM'12, Jan. 1, 2012, XP66169804, 4 pages.

Akihiko Torii, et al., "24/7 place recognition by view synthesis," 2015 IEEE Conference on Computer Vision and Pattern Recognition (CVPR), Jun. 7, 2015, XP032793638, pp. 1808-1817.

Arnold Irschara, et al., "From Structure-from-Motion Point Clouds to Fast Location Recognition," 2009 IEEE Conference on Computer Vision and Pattern Recognition : CVPR 2009, Jun. 20, 2009, XP031607114, pp. 2599-2606.

International Search Report and Written Opinion dated Sep. 23, 2016 in PCT/EP2015/081455 filed Dec. 30, 2015.

\* cited by examiner

SYSTEM FOR GENERATING 3D IMAGES FOR IMAGE RECOGNITION BASED POSITIONING

BACKGROUND OF THE INVENTION

Field of the Invention

The present invention relates to positioning methods and systems, i.e. methods and systems designed to identifying the position of a device triggering a location procedure. In detail, the present invention refers to Image Recognition Based—IRB—positioning. In more detail, the present invention relates to a method for generating 3D images to be used for IRB positioning.

Overview of the Related Art

Image Recognition Based positioning is a technology that may be advantageously implemented in Location Based Services—LBS—in order to achieve improved positioning and tracking capability. For example, LBS based on IRB positioning may be implemented for providing navigation services and/or augmented reality functionality services to a user.

IRB positioning technology allows identifying a position of a subject even in case the latter is located in environments, such as for example indoor and dense urban scenarios, where a positioning system, such as for example a Global Navigation Satellite System—GNSS, is not able to position the subject, or is able to position the subject with a low accuracy.

IRB positioning is based on an analysis of an image associated with a subject, e.g. a user equipment that acquired said image, which position is to be determined, for example a picture of the environment surrounding the subject.

An example of IRB positioning implemented in LBS may be found in Ghinamo Giorgio, Corbi Cecilia, Francini Gianluca, Lepsoy Skjalg, Lovisolo Piero, Lingua Andrea, and Aicardi Irene, "The MPEG7 Visual Search Solution for Image Recognition Based Positioning Using 3D Models", Proceedings of the 27th International Technical Meeting of The Satellite Division of the Institute of Navigation (ION GNSS+ 2014), Tampa, Fla., September 2014, pp. 2078-2088, which describes a location algorithm for mobile phones based on image recognition. The use of Image Recognition Based positioning in mobile applications is characterized by the availability of a camera equipped on a user equipment to be located. Under this constraint, to estimate the camera position and orientation, a prior knowledge of 3D environment is needed in the form of a database of 3D (synthetic) images with associated spatial information and color information. 3D images of the database can be built by means of a 3D model, acquired for instance with a LiDAR (Light Detection And Ranging), preferably with a Terrestrial LiDAR Survey or TLS. Particularly, through the data acquired by the TLS a 3D model of an environment is obtained over which Image Recognition Based positioning is provided. The 3D model comprises a plurality of points, i.e. a cloud of points, each point being described by a set of spatial coordinates, derived from the TLS using attitude of the light beam, the distance from the LiDAR and the position of the LiDAR and by color associated with that point. Each 3D image is created by projecting a subset of the points of the cloud of points of the 3D model on an image plane ("synthetic plane").

The proposed procedure to locate the camera can be divided in two steps, a first step is the selection from a database of the most similar 3D image to a query image acquired through the camera of the user equipment, and a second step calls for estimation of the position and orientation of the camera of the user equipment based on available 3D information on the reference image. In the location procedure the MPEG standard Compact Descriptors for Visual Search is used to select the image.

Ghinamo Giorgio, Corbi Cecilia, Lovisolo Piero, Lingua Andrea, Aicardi Irene, and Grasso Nives, "Accurate Positioning and Orientation Estimation in Urban Environment Based on 3D Models", ICIAP 2015 18th International Conference on Image Analysis and Processing 7-11 Sep. 2015 Genova, Italy, Volume: ISCA 2015, describes a positioning algorithm for mobile phones based on image recognition. The use of image recognition based (IRB) positioning in mobile applications is characterized by the availability of a single camera for estimate the camera position and orientation. A prior knowledge of 3D environment is needed in the form of a database of images with associated spatial information that can be built projecting the 3D model on a set of synthetic solid images (range+RGB images). The IRB procedure proposed can be divided in two steps: the selection from the database of the most similar image to the query image used to locate the camera and the estimation of the position and orientation of the camera based on available 3D data on the reference image. The MPEG standard Compact Descriptors for Visual Search (CDVS) has been used to reduce hugely the processing time.

Lowe D., "Distinctive image features from scale-invariant key points", International Journal of Computer Vision 60, pages 91-110, discloses a method for extracting distinctive invariant features from images that can be used to perform reliable matching between different views of an object or scene. The features are invariant to image scale and rotation, and are shown to provide robust matching across a substantial range of affine distortion, change in 3D viewpoint, addition of noise, and change in illumination. The features are highly distinctive, in the sense that a single feature can be correctly matched with high probability against a large database of features from many images. An approach to using these features for object recognition is also disclosed. The recognition proceeds by matching individual features to a database of features from known objects using a fast nearest-neighbor algorithm, followed by a geometric transform to identify clusters belonging to a single object, and finally performing verification through least-squares solution for consistent pose parameters.

WO 2015/011185 discloses a method for identifying key points in a digital image comprising a set of pixels. Each pixel has associated thereto a respective value of an image representative parameter. Said method comprises approximating a filtered image. Said filtered image depends on a filtering parameter and comprises for each pixel of the image a filtering function that depends on the filtering parameter to calculate a filtered value of the value of the representative parameter of the pixel. Said approximating comprises: a) generating a set of base filtered images; each base filtered image is the image filtered with a respective value of the filtering parameter; b) for each pixel of at least a subset of said set of pixels, approximating the filtering function by means of a respective approximation function based on the base filtered images; said approximation function is a function of the filtering parameter within a predefined range of the filtering parameter; the method further comprises, for each pixel of said subset, identifying such pixel as a candidate key point if the approximation function has a local extreme which is also a global extreme with respect to the filtering parameter in a respective sub-range internal to said predefined range. For each pixel identified as a candidate key point, the method further comprises: c) comparing the value assumed by the approximation function at the value of the filtering parameter corresponding to the global extreme of the pixel with the values assumed by the approximation functions of the adjacent pixels in the image at the values of the filtering parameters of the respective global extremes of such adjacent pixels, and d) selecting such pixel based on this comparison S. Lepsoy, G. Francini, G. Cordara, and P. P. de Gusmao, "Statistical modelling of outliers for fast visual search", IEEE International Conference on Multimedia and Expo (ICME), pages 1-6, 2011 discloses that matching of key points present in two images is an uncertain process in which many matches may be incorrect. The statistical properties of log distance ratio for pairs of incorrect matches are distinctly different from the properties of that for correct matches. Based on a statistical model, a goodness-of-fit test is proposed in order to establish whether two images contain views of the same object. The goodness-of-fit test can be used as a fast geometric consistency check for visual search.

WO 2012/113732 discloses an apparatus for determining model parameters, the apparatus comprising an object model transformer, a region comparator, and a model parameter determiner. The object model transformer is configured to receive an object model of a known object and to transform the object model based on a set of model parameters from a first frame of reference to a second frame of reference. The object model transformer is further configured to determine as result of this transformation a transformed object model comprising at least one region, the at least one region being associated to an object region of the object. The region comparator is configured to receive the transformed object model and an image depicting the object, to determine for a selected region of the transformed object model a region-related similarity measure representative of a similarity between the selected region and an image section of the image associated to the selected region via a transformation-dependent mapping. The model parameter determiner is configured to determine an updated set of model parameters on the basis of the region-related similarity measure and an optimization scheme.

R. Mautz and S. Tilch, "Survey of Optical Indoor Positioning Systems", International Conference on Indoor Positioning and Indoor Navigation (IPIN), 21-23 Sep. 2011 provides a survey of current optical indoor positioning approaches. Different systems are briefly described and categorized based on how the images are referenced to the environment.

ISO/IEC DIS 15938-13 "Compact Descriptors for Visual MPEG-7 standard" MPEG 108—Valencia Spain, March-April 2014, specifies an image description tool designed to enable efficient and interoperable visual search applications, allowing visual content matching in images. Visual content matching includes matching of views of objects, landmarks, and printed documents, while being robust to partial occlusions as well as changes in viewpoint, camera parameters, and lighting conditions.

WO 2012/100819 discloses method for comparing a first image with a second image. The method comprises identifying first key points in the first image and second key points in the second image and associating each first key point with a corresponding second key point in order to form a corresponding key point match. For each pair of first key points, the method further comprises calculating the distance therebetween for obtaining a corresponding first length. Similarly, for each pair of second key points, the method comprises calculating the distance therebetween for obtaining a corresponding second length. The method further comprises calculating a plurality of distance ratios; each distance ratio is based on a length ratio between a selected one between a first length and a second length and a corresponding selected one between a second length and a first length, respectively. The method still further includes calculating a statistical distribution of the plurality of distance ratios and generating a model function expressing a statistical distribution of further distance ratios corresponding to a random selection of key points in the first and second images. The method includes comparing said statistical distribution of the plurality of distance ratios with said model function, and assessing whether the first image contains a view of an object depicted in the second image based on said comparison.

WO 2013/102488 discloses a method for comparing a first image with a second image, comprising: identifying first key points in the first image and second key points in the second image; forming matches between first and second key points by associating each first key point with a corresponding second key point; calculating a plurality of first distance ratios, each first distance ratio being based on the ratio of the distance between a pair of said first key points and the distance between a corresponding pair of said second key points matching the pair of first key points; arranging a distribution of values of said calculated plurality of first distance ratios in a histogram having a plurality of ordered bins each corresponding to a respective interval of values of the first distance ratios, the histogram enumerating for each bin a corresponding number of first distance ratios of the distribution having values comprised within the respective interval; generating an outlier density function expressing a statistical distribution of a plurality of second distance ratios corresponding to a random selection of key points pairs in the first and second images, said plurality of second distance ratios being based on the ratio of the distance between pairs of first key points in the first image and the distance between corresponding pairs of randomly selected second key points in the second image; discretizing said outlier density function by generating for each of said bin a corresponding outlier probability density value. The method further comprises: determining a number of correct key point matches, each formed by a first and a second key points corresponding to a same point of a same object depicted in the first and second images, said determining a number of correct key point matches including: determining a matrix, each element of said matrix corresponding to a respective pair of key point matches and having a value corresponding to the difference between the value of said histogram at the bin including the distance ratio of the respective pair of key point matches and the outlier probability density value corresponding to said bin, said outlier probability density value being weighted by means of a parameter; determining a value of the parameter such that the dominant eigenvector of the matrix is equal to a vector having elements of a first value if the pair of key point match is a correct key point match an of a second value if the pair of key point match is an incorrect key point match; determining the number of correct key point matches as an expression of the dominant eigenvalue associated to said dominant eigenvector, wherein for comparing said first image with said second image the determined number of correct key point matches is exploited.

Sikora, "Visual Standard for Content Description—An Overview", IEEE Transactions on circuits and systems for video technology, Vol. 11, No. 6, June 2001 discloses that MPEG-7 Visual Standard under development specifies content-based descriptors that allow users or agents (or search engines) to measure similarity in images or video based on visual criteria, and can be used to efficiently identify, filter, or browse images or video based on visual content. More specifically, MPEG-7 specifies color, texture, object shape, global motion, or object motion features for this purpose.

S. Katz, A. Tal, R. Basri: "Direct Visibility of Point Sets", ACM Transactions on Graphics, Vol. 26, No. 3, Article 24, July 2007 discloses a simple and fast operator, the Hidden Point Removal operator, which determines the visible points in a point cloud, as viewed from a given viewpoint. Visibility is determined without reconstructing a surface or estimating normals. It is shown that extracting the points that reside on the convex hull of a transformed point cloud, amounts to determining the visible points. This operator is general it can be applied to point clouds at various dimensions, on both sparse and dense point clouds, and on viewpoints internal as well as external to the cloud. It is demonstrated that the operator is useful in visualizing point clouds, in view-dependent reconstruction and in shadow casting.

SUMMARY OF THE INVENTION

The Applicant has observed that, generally, method and systems known in the art can be improved for identifying locations based on images with a better accuracy. Particularly, the Applicant has perceived that a need exists for automatically generating 3D images that comprise spatial and color information, to be exploited in IRB positioning in order to increase accuracy in an estimation of the position of a user equipment that provided a query image.

The automatically generated 3D images may for example be exploited for automatically updating, enriching a database of 3D images, exploited by IRB positioning, in order to increase availability of images (and thus rate of success of finding an image matching a query image) and accuracy in an estimation of the position of a user equipment that provided a query image.

The Applicant has found that new, or additional 3D images to be used in IRB positioning may be generated by processing query images, acquired by devices (user equipment) to be located, together with the cloud of points comprised in the 3D model of the environment.

In particular, the additional 3D images may be generated on the basis of query images combined with selected 3D images already comprised in a database of reference images generated by projecting the cloud of points on a synthetic plane.

Particularly, the Applicant has found that an additional 3D image may be dynamically generated by maximizing a similarity in terms of key points descriptors, i.e. a selected 3D image is processed in order to maximize a number of correctly matched key points with the key points extracted from a query image, thus obtaining the additional 3D image having a maximized number and a relative level of similarity of couples of key points of the additional 3D image and the query image starting from a selected 3D image chosen as a starting reference comprised in the database of 3D images.

Particularly, one aspect of the present invention proposes a method of positioning a user equipment located in an environment. The user equipment comprises a camera for acquiring digital images. The method comprises: defining a three-dimensional model of the environment through a cloud of points, each point being defined by a set of coordinates and a color information; having the user equipment acquiring a query image by capturing, by means of the camera, a portion of the environment; estimating an initial camera parameters configuration of the camera of the user equipment; evaluating a similarity between the query image and an initial three-dimensional image, said initial three-dimensional image being obtained from the three-dimensional model of the environment as seen by a virtual camera having said initial camera parameters configuration; modifying a camera parameters configuration of the virtual camera associated with the initial three-dimensional image in order to increase the similarity between the initial three-dimensional image and the query image up to a predetermined value, and generating an additional three-dimensional image based on the three-dimensional model of the environment, said additional three-dimensional image being obtained from the three-dimensional model of the environment as seen by a modified virtual camera having the modified camera parameters configuration.

Preferred features of the present invention are set forth in the dependent claims.

In one embodiment of the invention, estimating an initial camera parameters configuration of the camera of the user equipment comprises evaluating a similarity between the query image and three-dimensional images comprised in a database of images, each three-dimensional image being generated based on three-dimensional model of the environment as seen by a respective virtual camera having a respective camera parameters configuration; identifying a most similar three-dimensional image of the database of images among the three-dimensional images comprised in a database of images. Preferably, estimating an initial camera parameters configuration of the camera of the user equipment comprises estimating the initial camera parameters configuration of the camera of the user equipment based on respective camera parameters configuration of the respective virtual camera associated with the most similar three-dimensional image, and exploiting the most similar three-dimensional image as the initial three-dimensional image.

In one embodiment of the invention, identifying a most similar three-dimensional image of the database of images among the three-dimensional images comprised in a database of images comprises extracting local descriptors from the query image and from the three-dimensional images comprised in the database of images. Preferably, for the query image and for each one of the three-dimensional images comprised in the database of images comprises selecting local descriptors having the highest statistical characteristic values among all the local descriptors, and obtaining global descriptors as a statistical representation of a set local descriptors having the highest statistical characteristic values among all the local descriptors. Preferably, identifying a most similar three-dimensional image of the database of images among the three-dimensional images comprised in a database of images further comprises evaluating a global descriptors similarity score between each three-dimensional images comprised in the database of images and the query image; selecting a set of three-dimensional images having at least a minimum predetermined global descriptors similarity score.

In one embodiment of the invention, identifying a most similar three-dimensional image of the database of images among the three-dimensional images comprised in a database of images further comprises identifying as the most similar three-dimensional image of the database of images among the three-dimensional images comprised in a database of images the three-dimensional image of the set having the highest global descriptors similarity score.

In one embodiment of the invention, identifying as the most similar three-dimensional image of the database of images among the three-dimensional images comprised in a database of images the three-dimensional image of the set having the highest global descriptors similarity score comprises extracting key points from the query image and from the three-dimensional images comprised in the set; searching matches between key points of the query image and key points of each of the three-dimensional images comprised in the set; identifying as the most similar three-dimensional image of the database of images among the three-dimensional images comprised in set, the three-dimensional image of the set having the highest number of matching key points.

In one embodiment of the invention, extracting key points from the query image and from the three-dimensional images comprised in the set comprises for each key point, identifying a respective set of coordinates indicating a position of the key point within the three-dimensional model of the environment.

In one embodiment of the invention, the user equipment is arranged for exchanging signals with a data network. Preferably, estimating an initial camera parameters configuration of the camera of the user equipment estimating comprises exploiting the signals exchanged between the user equipment and the data network for estimating the initial camera parameters configuration of the camera of the user equipment.

In one embodiment of the invention, estimating an initial camera parameters configuration of the camera of the user equipment estimating comprises exploiting a Global Navigation Satellite System for estimating the initial camera parameters configuration of the camera of the user equipment.

In one embodiment of the invention, modifying a camera parameters configuration of the virtual camera associated with the initial three-dimensional image in order to increase the similarity between the initial three-dimensional image and the query image up to a predetermined value comprises searching the modified camera parameters configuration that corresponds to a local maximum of the similarity score with the query image.

In one embodiment of the invention, searching the modified camera parameters configuration that corresponds to a local maximum of the similarity score with the query image stopping the search when is found a modified camera parameters configuration that corresponds to a similarity score with the query image equal to, or greater than, a predetermined target threshold of the similarity score with the query image.

In one embodiment of the invention, the method further comprises performing the positioning of the user equipment based on the additional three-dimensional image.

In one embodiment of the invention, the method further comprises performing the positioning of the user equipment based on the most similar three-dimensional image of the database of images while modifying a camera parameters configuration of the virtual camera associated with the initial three-dimensional image in order to increase the similarity between the initial three-dimensional image and the query image up to a predetermined value, and generating an additional three-dimensional image based on the three-dimensional model of the environment, said additional three-dimensional image being obtained from the three-dimensional model of the environment as seen by a modified virtual camera having the modified camera parameters configuration.

In one embodiment of the invention, the method further comprising storing the additional three-dimensional image in a database of images, each three-dimensional image being generated based on three-dimensional model of the environment as seen by a respective virtual camera having a respective camera parameters configuration.

Another aspect of the present invention proposes a system for positioning a user equipment located in an environment, the user equipment comprising a camera for acquiring digital images, the system comprising an Image Recognition Based positioning subsystem arranged for receiving at least a query image from the user equipment and for identifying the position of the user equipment by performing the method according to the method of above.

In one embodiment of the invention, the Image Recognition Based positioning subsystem comprises a communication module arranged for providing and managing communications between the user equipment and the Image Recognition Based positioning subsystem, and a storage element storing a three-dimensional model of the environment through a cloud of points, each point being defined by a set of coordinates and a color information.

In one embodiment of the invention, the Image Recognition Based positioning subsystem further comprises an images database storing a plurality of three-dimensional images, each three-dimensional image being generated based on three-dimensional model of the environment as seen by a respective virtual camera having a respective camera parameters configuration; a visual search module arranged for comparing three-dimensional images comprised in the images database with the query image provided by the user equipment; a photogrammetry module arranged for estimating a position of the user equipment that provided the query image based on at least one three-dimensional image, and an image generation module arranged for generating an additional three-dimensional image to be added to the images database by processing query image and three-dimensional images.

BRIEF DESCRIPTION OF THE DRAWINGS

These and others features and advantages of the solution according to the present invention will be better understood by reading the following detailed description of an embodiment thereof, provided merely by way of non-limitative examples, to be read in conjunction with the attached drawings, wherein.

DETAILED DESCRIPTION OF THE INVENTION

Figure 1:
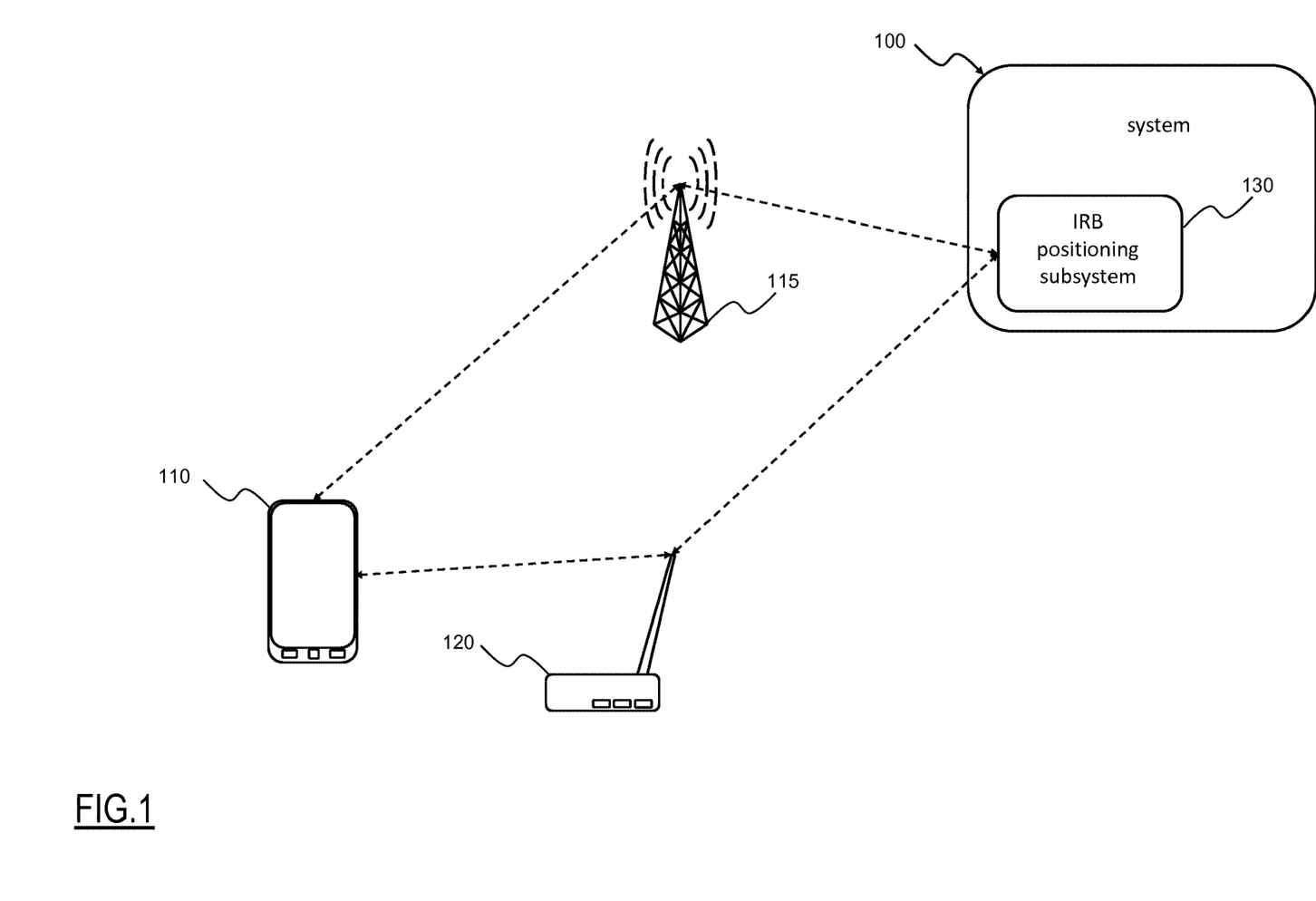
FIG. 1 schematically shows a system for providing Location Based Services according to an embodiment of the present invention.

With reference to the drawings, in FIG. 1 there is schematically shown a system 100 for providing Location Based Services (LBS) according to an embodiment of the present invention.

The system 100 according to an embodiment of the invention is arranged for identifying a position of a User Equipment or UE 110 (e.g., a smartphone, a tablet, a laptop/notebook, etc.) which triggers (i.e., activates or requests) a Location Based Service (e.g., a navigation or a augmented reality software application instantiated in the UE 110), which may be provided by the system 100.

The system 100 may be in communication relationship with the UE 110 by means of a data network. The data network may for example include a radio communications network, e.g. a mobile communications network (like a third-generation—3G—or fourth-generation—4G—mobile communications network), or a Wi-Fi network. In FIG. 1, reference numeral 115 schematizes a base station of a mobile communications network, whereas reference numeral 120 schematizes a wireless access point of a Wi-Fi network.

The system 100 is arranged for managing the provision of the Location Based Service and for exchanging information with the UE 110, in order to ensure the Location Based Services.

The system 100 according to an embodiment of the invention comprises an Image Recognition Based, or IRB, positioning subsystem 130 arranged for identifying a position of the UE 110 on the basis of an image of a portion of the environment surrounding the UE 110, simply indicated as 'query image' in the following.

The UE 110 should comprise the necessary elements to provide the query image, namely a camera element (e.g., an embedded digital camera not shown in the drawings) capable of capturing a (digital) image, and transmission apparatus (e.g., a radio transceiver) capable to transmit the query image to the IRB positioning subsystem 130, e.g. through the data network.

Preferably, an IRB positioning (provided by the IRB positioning subsystem 130) may be exploited either alone or in combination with the rough positioning obtainable by exploiting wireless communication signals of the data network, e.g. the (initial) rough position of the UE 110 thus reducing a computational complexity of the location procedure (i.e., the initial rough positioning allows narrowing a geographic area of the environment to be considered for the IRB positioning).

The IRB positioning may be exploited for providing a highly reliable positioning of the UE 110, particularly when the UE 110 is located in environments, such as for example indoor and/or in dense urban scenarios, in which case the size of the geographic area is limited (e.g., in the order of hundreds of square meters or lower) and other positioning expedients e.g., based on wireless communication signals of the data network and/or even Global Navigation Satellite Systems (GNSS) have an insufficient accuracy.

It should be noted that the system 100 may be preferably, although not limitatively, implemented as a system distributed over the cellular communication network, the WLAN, the UE 110 and/or one or more application servers connected or connectable to the cellular communication network, the WLAN and/or the Internet (not detailed in FIG. 1).

Generally, the system 100—particularly the IRB positioning subsystem 130—may comprise functionalities implemented by software products (e.g., software applications, software agents, Application Programming Interfaces—API, etc.) instantiated on one or more circuitry (e.g., comprising one or more processor, controller, dedicated Application-Specific Integrated Circuits—ASIC, volatile and/or non-volatile memories, etc.) of devices comprised in the system 100 (e.g., UE 110, radio base station 115, wireless access gateway 120). Moreover, the application servers may comprise a single computer, or a network of distributed computers, either of physical type (e.g., with one or more dedicated computer network machines, such as for example a dedicated remote server, data center, one or more personal computers, etc.) or of virtual type (e.g., by implementing one or more virtual machines in one or more general purpose computer network machines, such as for example a dedicated remote server, data center, one or more personal computers, etc.) and connected or connectable to the cellular communication network and/or the WLAN.

Figure 2:
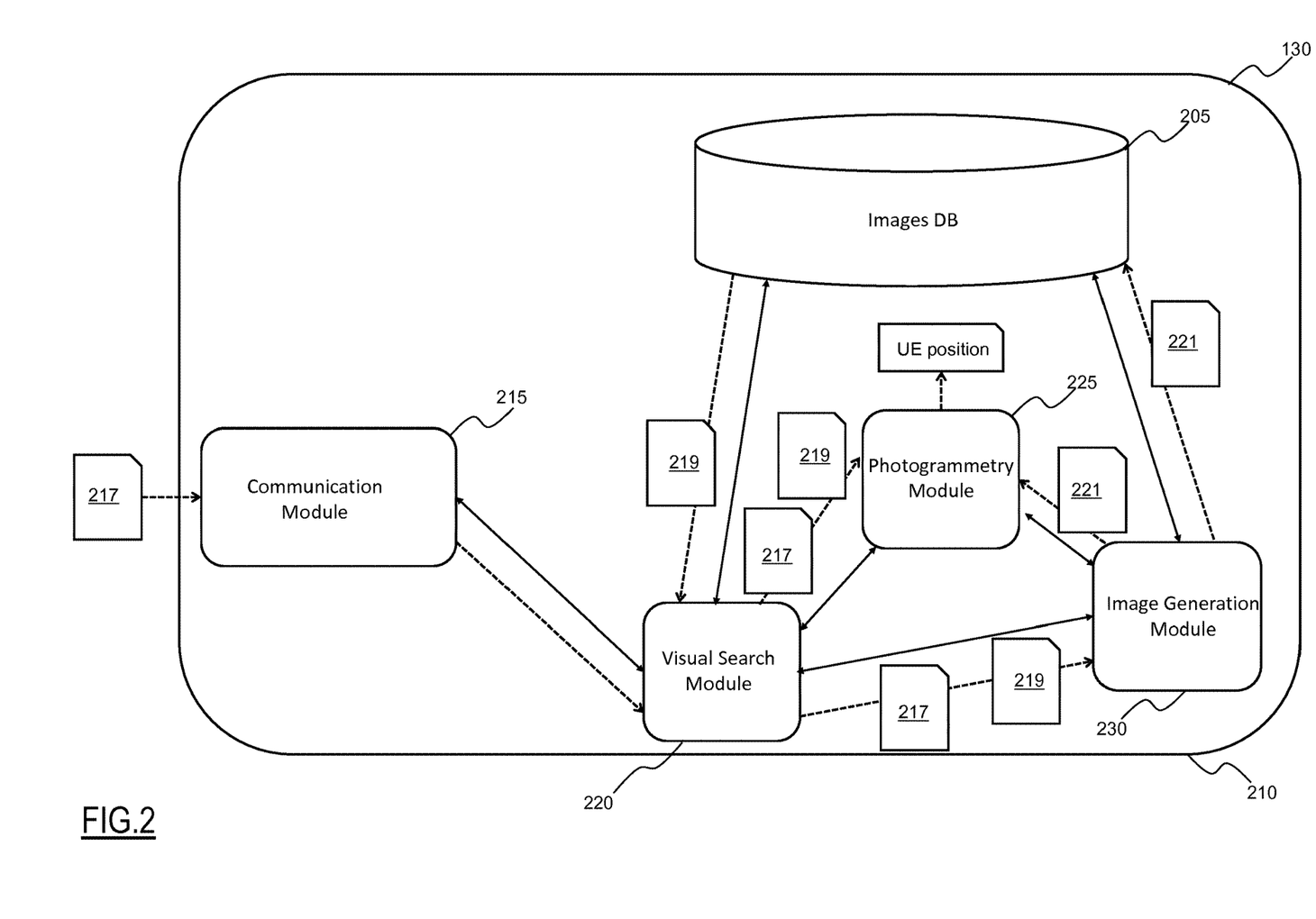
FIG. 2 is a schematic block representation of a subsystem arranged for implementing an Image Recognition Based positioning according to an embodiment of the present invention.

The IRB positioning subsystem 130 according to an embodiment of the present invention is described in the following with reference to FIG. 2, which is a schematic block representation thereof.

The IRB positioning subsystem 130 preferably, although not limitatively, comprises an images Data Base, or images DB 205, a communication module 215, a visual search module 220, a photogrammetric module 225 and an image generation module 230.

The visual search module 220 is arranged for comparing 3D images 219 (described in the following) comprised in the images DB 205 with each query image 217 provided by the UE 110 in order to identify one or more 3D images similar to the query image 217 (as described in the following). Preferably, the visual search module 220 is arranged for identifying a 3D image 219, among the 3D images of the images DB 205, most similar to the query image 217 (as described in the following).

The photogrammetry module 225 is arranged for identifying a position associated with a (virtual) camera that acquired a 3D image 219 (as described in the following). Preferably, the photogrammetry module 225 may be exploited for identifying the position of the (virtual) camera that acquired the most similar 3D image 219 (as described in the following).

The image generation module 230 is arranged for generating additional 3D images 221 to be added to the images DB 205 by processing query images 217 and 3D images 219 (as discussed in the following). Preferably, the additional 3D images 221 may be generated while providing Location Based Services to a requesting UE 110.

The images DB 205 comprises a plurality of 3D (synthetic) images, each 3D image being generated by a projection on a synthetic plane of a plurality, or 'cloud' of points of a 3D model of the environment, which also comprise respective spatial and color information (as described in the following). For example, the images DB 205 may be built as described in Ghinamo Giorgio, Corbi Cecilia, Francini Gianluca, Lepsoy Skjalg, Lovisolo Piero, Lingua Andrea, and Aicardi Irene: "The MPEG7 Visual Search Solution for Image Recognition Based Positioning Using 3D Models", Proceedings of the 27th International Technical Meeting of The Satellite Division of the Institute of Navigation (ION GNSS+ 2014), Tampa, Fla., September 2014, pages 2078-2088.

The 3D model may be generated with a Terrestrial Laser Scanning (TLS) system comprising a LiDAR (Light Detection And Ranging) instrument, which also allows the acquisition of images of the generic environment area using e.g. an integrated camera.

The 3D images of the images DB 205 of a generic environment area may be created by processing the 3D model thereof.

A plurality of different scans of the generic environment area performed by the TLS system are acquired and exploited to build the 3D model of the corresponding environment, by mounting each scan in a single 3D model referred to a three-dimensional coordinates reference system.

It should be noted that, when multiple scans of the environment are considered and fused together, in order to avoid texture problems in the 3D images subsequently generated homogeneous scanning light exposure conditions should be achieved in between different scans for coincident environment sectors. Alternatively and/or in addition, in order to avoid texture problems during the subsequent 3D image generation a single scan may be considered.

As a result of the process, a cloud of (three-dimensional—3D) points of the environment area is built. Particularly, each point of the cloud is defined by a set of three-dimensional coordinates and color information. Color information is determined through the images acquired by the camera present in the LiDAR instrument. The term 'color information' is herein used to indicate that the points may be associated with a color chosen between at least two colors (e.g., the RGB color model), alternatively or in addition, the color information comprises a luminance information (i.e., a luminous intensity of each point).

Each 3D image of the images DB 205 is generated as if a virtual, or synthetic camera, acquired an image of a portion of the 3D model of the environment. Particularly, each 3D image of the images DB 205 is generated by projecting a subset of points of the cloud of points on a synthetic plane according to camera parameters configuration associated with the synthetic camera; i.e., each 3D image of the images DB 205 is generated from the three-dimensional model of the environment as seen by a virtual camera having a predetermined camera parameters configuration. The subset of points selected for generating each 3D image of the images DB 205 may be selected belonging to a convex surface, as described in S. Katz, A. Tal, R. Basri: "Direct Visibility of Point Sets", ACM Transactions on Graphics, Vol. 26, No. 3, Article 24, July 2007.

Camera parameters comprise external orientation parameters corresponding to position and orientation of the synthetic camera. Camera parameters further comprise internal orientation parameters corresponding to focal length and principal point position (e.g., expressed in terms of pixel coordinates) of the synthetic camera. Camera parameters also comprise an indication of the resolution of the 3D image to be obtained and of the pixel size thereof.

Therefore, each pixel of a generic 3D image of the images DB 205 is associated with respective spatial information, which comprise for each pixel an indication of a distance from the synthetic camera, and color information of the captured detail for each single pixel.

Advantageously, in an embodiment of the present invention, the 3D images of the images DB 205 are analyzed for identifying key points thereof (e.g., based on the color information of the points of the cloud of points), and each identified key point is located within the reference system used in the 3D model based on the spatial information associated with the pixel comprised in the considered 3D image of the images DB 205.

In order to provide an exhaustive coverage of the environment where the IRB positioning is implemented, the images DB 205 should comprise a sufficient number of 3D images for each modeled environment, associated with different camera positions, orientations and focal lengths. The number of 3D images that are deemed sufficient depends on an extent and features of the environment considered, and also depends on the purpose for which the IRB positioning is implemented. For example, the IRB positioning of a UE 110 located in an environment corresponding to a city street or square requires a lower number of 3D images (e.g., images may be generate with a 2 meters pitch) than the number of 3D images (e.g., images may be generate with a 20 centimeters pitch) required for an IRB positioning of a UE 110 for description of e.g. details of the furniture in indoor environments.

Advantageously, the images DB 205 or another storage element (not shown in FIG. 2) stores the 3D model of the environment.

The communication module 215 is arranged for providing and managing communications between the UE 110 and the IRB positioning subsystem 130. For example, the communication module 215 may be configured for exploiting at least one data network for establishing a communication with the UE 110 in order to receive query images and provide an indication of the position identified to the UE 110.

Figure 3:
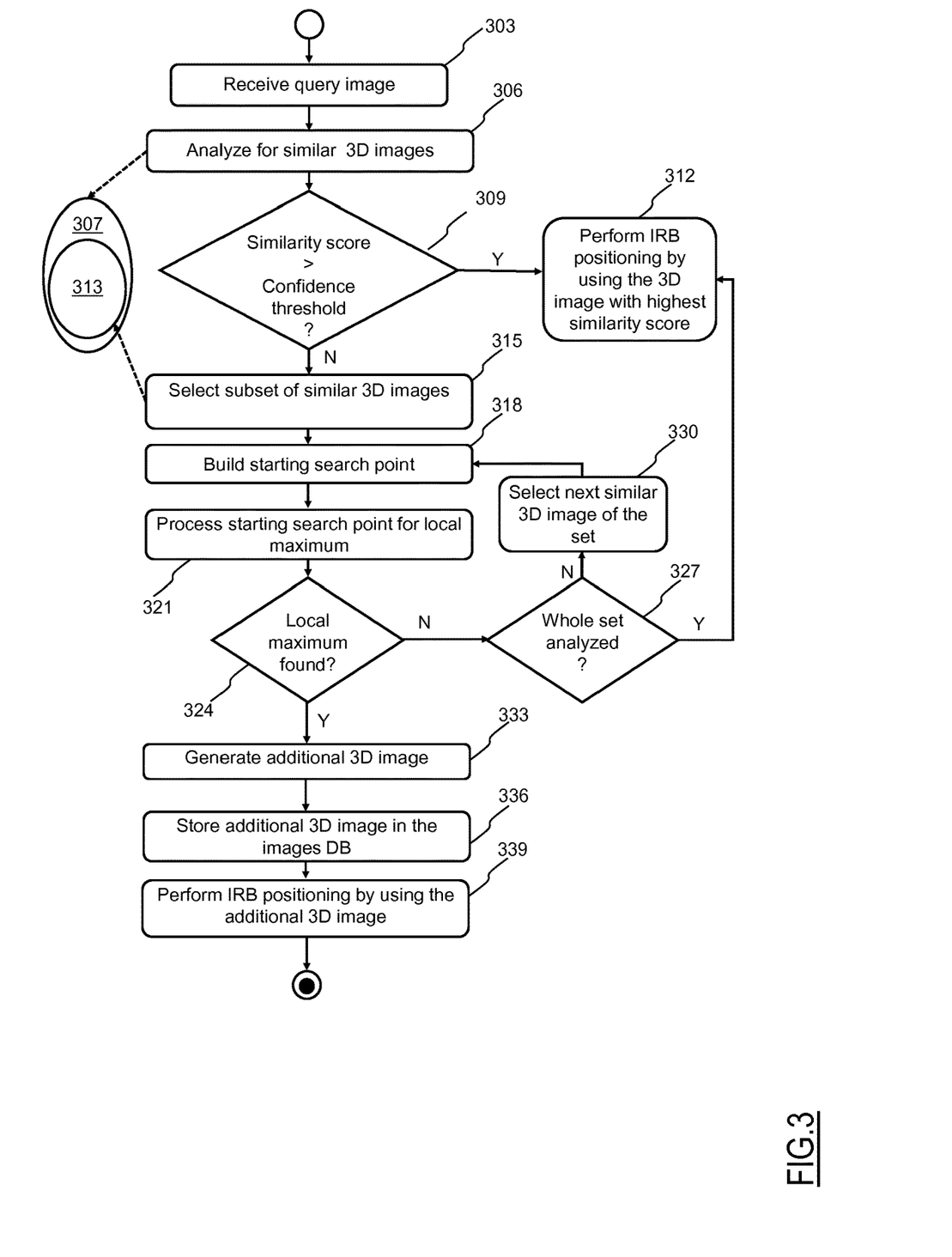
FIG. 3 is a schematic flowchart of an Image Recognition Based positioning and for improving an images Data Base according to an embodiment of the present invention.

Having generally described the system 100 for providing Location Based Services and the IRB positioning subsystem 130, a procedure for identifying the position of the UE 110 by means of IRB positioning and for improving the images DB 205 according to an embodiment of the present invention is now described, by making reference to FIG. 3.

Initially (block 303), a query image 217 is received by the IRB positioning subsystem 130; the query image 217 is provided by the UE 110 which position is to be determined.

Preferably, the query image 217 is received by the communication module 215 of the IRB positioning subsystem 130 connected with the data network, and is then provided to the visual search module 220.

In the IRB positioning subsystem 130, the visual search module 220 compares (block 306) the query image 217 with 3D images 219 of the images DB 205.

For example, as described in Ghinamo Giorgio, Corbi Cecilia, Francini Gianluca, Lepsoy Skjalg, Lovisolo Piero, Lingua Andrea, and Aicardi Irene: "The MPEG7 Visual Search Solution for Image Recognition Based Positioning Using 3D Models", Proceedings of the 27th International Technical Meeting of The Satellite Division of the Institute of Navigation (ION GNSS+ 2014), Tampa, Fla., September 2014, pp. 2078-2088, MPEG CDVS visual search technology can be implemented for identifying, in the images DB 205, a 3D image 219 having the highest similarity score with the query image.

Preferably, in order to select a most similar 3D image 219 of the images DB 205, the following operations are performed by the visual search module 220.

Local descriptors in the query image 217 and in the 3D images 219 included in the images DB 205 are considered (e.g., the local descriptors can be extracted from the images).

For example, the local descriptors of the query image 217 and of the 3D images 219 are described by a statistical characteristic (e.g., mean value, variance, etc.), and the local descriptors having the highest statistical characteristic values among all the local descriptors of the respective query image 217 and of the 3D image 219 are selected as the most significant local descriptors (e.g., as described in ISO/IEC DIS 15938-13 "Compact Descriptors for Visual MPEG-7 standard" MPEG 108—Valencia Spain, March-April 2014.

Global descriptors of the images (query image 217 and 3D images 219) are then obtained, from the local descriptors. Global descriptors provide a statistical representation of a set of most significant local descriptors extracted from the images.

The 3D images 219 of the images DB 205 are preliminary ranked based on a global descriptor fast screening aimed at assigning a global descriptors similarity score with the query image 217.

As a result of the global descriptor fast screening, a number of 3D images 219 of the images DB 205 potentially similar to the query image 217 are selected. In other words, a set 307 of selected 3D images 219 having at least a minimum predetermined global descriptors similarity score is defined Each one of the selected 3D images 219 of the set 307 is compared to the query image 217 in order to determine a matching between each selected 3D image 219 and the query image 217.

Preferably, the comparison comprises exploiting key points of (e.g., extracted from) both a considered 3D image 219 and the query image 217. For example, matches between key points of the two compared images are searched. The 3D image 219 and the query image 217 are considered matching images in case a predetermined sufficient number of matching key points is identified. Matching images are deemed representing substantially identical, or very similar, views of the same portion of the environment area.

The identified key points matches are preferably validated by a geometry check based on the concept that the statistical properties of log distance ratio for pairs of incorrect key points matches (i.e., "outliers") are distinctly different from the statistical properties of log distance ratio for pairs of correct key points matches. For example, in order to assess that two images are matched images a sufficient number of matches should pass the geometry check. For avoiding false detection a number of matches that pass the geometry check superior to, e.g., 4÷6 has to be taken into account. With number of matches that pass the geometry check below 4÷6 the images may still be considered as matching images with good a probability, but false match detection may appear.

The selected 3D images 219 of the images DB 205 are then ranked by means of a similarity score with respect to the query image 217. Preferably, the similarity score may be based on a number of validated key points matches and/or a reliability of each key points match (for example established by exploiting log distance ratios of matching key points in the query image and in the selected 3D images 219.

The selected 3D image 219 having the highest similarity score may be considered the 3D image 219 of the images DB 205 most similar to the query image 217.

It should be noted that the similarity scores of the selected 3D images 219 have not a deterministic value (apart for global descriptor and geometry check validation). Indeed, the similarity score of a selected 3D image 219 simply provides information about a potential similarity between the query image 217 and the selected 3D image 219.

Therefore, it may happen that the selected 3D image 219 having the highest similarity score does not allow performing an estimation of a position of a camera of the UE 110 that took the query image 217 with a sufficient accuracy (e.g., a positioning error equal to, or lower than, 50 cm) as required by an application (e.g., indoor navigation or augmented reality) for which the LBS based on IRB positioning is provided.

In one embodiment of the invention, the highest similarity score is therefore compared with a confidence threshold (decision block 309) for determining whether the match between the identified most similar 3D image 219 (i.e., the selected 3D image 219 having the highest similarity score) and the query image 217 is sufficiently reliable; the aim of such comparison is to assess whether the query image 217 and the identified most similar 3D image 219 corresponds to a capture of substantially the same portion of environment from substantially the same point of view (in which case the generation of an additional 3D image could be omitted).

In the affirmative case (exit branch Y of decision block 309), i.e., if the highest similarity score is greater than the confidence threshold, the identified most similar 3D image 219 is considered a reliable match of the query image 217 and the IRB positioning of the UE 110 is then performed (block 312; by the image processing module 210) by the photogrammetry module 225.

For example, the position of the UE 110 is estimated by the photogrammetry module 225 based on the spatial information of the identified most similar 3D image 219.

Preferably, the photogrammetry module 225 is arranged for estimating external orientation parameters (position and orientation) comprised in a camera parameter configuration of the camera associated with the query image 217. External orientation parameters may be obtained based on the resolution of a collinearity equation where the key points of the query image 217 are associated with the spatial information of matching key points in the most similar 3D image 219. Internal orientation parameters (i.e., focal length, and principal point coordinates) may be also estimated in the procedure on order to improve the accuracy of external orientation parameters estimation.

The position of the UE 110 is considered as corresponding to the coordinates contained in the external orientation parameters estimated (possibly adjusted according to the internal orientation parameters).

In the negative case (exit branch N of decision block 309), i.e., if the highest similarity score is lower than the confidence threshold, the identified most similar 3D image 219 having the highest similarity score is not considered to be a sufficiently reliable match of the query image 217.

Therefore, the image generation module 230 attempts to generate an additional 3D image 221 capable of providing a sufficiently reliable match of the query image 217, i.e., an additional 3D image 221 having a similarity score greater than the confidence threshold or, at least, greater than the highest similarity score of the previously identified most similar 3D image 219.

In more detail, a similar 3D images subset 313 of the selected 3D images 219 is built by a selection (block 315) among the previously selected 3D images 219 (it should be noted that the similar 3D images subset 313 of selected 3D images 219 may comprise a number of selected 3D images 219 ranging from a single selected 3D image 219 to all the previously selected 3D images 219).

Preferably, the selected 3D images 219 of the similar 3D images subset 313 are selected (e.g., by the image processing module 210) on the base of a similarity score obtained by the comparison with the query image 217 (performed at block 306).

For example, for successfully performing a location procedure selected 3D images 219 of the similar 3D images subset 313 preferably have a similarity score equal to, or greater than, four or five (4 or 5) when a CDVS-MPEG algorithm is exploited for evaluating the similarity score (i.e. the score is calculated based on the number of matched key points and/or similarity between couples of descriptors found during the fast screening between the selected 3D images 219 and the query image 217).

Preferably the image generation module 230 exploits spatial and color information, particularly respective camera parameters configuration of a respective synthetic camera associated with selected 3D image 219 of the similar 3D images subset 313, in order to generate an additional 3D image 221 (characterized by a different camera parameters configuration of a corresponding synthetic camera) having an increased similarity score with the query image 217.

For each selected 3D image 219 of the similar 3D images subset 313 to be processed (preferably starting from the previously identified most similar 3D image 219, having the highest similarity score with the query image 217), a respective starting search point is built (block 318).

The starting search point is defined by a plurality of dimensions in a multidimensional space. Advantageously, at least part of the camera parameters described above may be used as dimension of the multidimensional space. For example, the starting search point may be defined by six (6) dimensions (i.e., a six dimensional space is considered plus in possible implementation the focal length as seventh dimension), namely the starting search point is described by six (6) coordinates: three (3) dimensional coordinates defining the position (in our three-dimensional space) of the camera that acquired the considered selected 3D image 219, and three (3) attitude angles of the synthetic camera that captured the considered selected 3D image 219. A point in the six dimensional space, identified by the six coordinates, corresponds to a certain camera parameters configuration.

In other words, the starting search point may be considered as the positioning of the synthetic camera associated with the most similar image for given query image. From another point of view, the starting search point may be considered as an (rough) evaluation of a (initial) camera parameters configuration associated with the camera of the user equipment 110 that acquired the query image 217.

It should be noted that the focal length may be considered as a known parameter for the camera of the UE 110 to be located.

The starting search point is then processed (block 321) in order to obtain an increase in the similarity score (i.e., higher than the starting similarity score).

During the processing of the starting search point, the six (6) dimensional space is examined, i.e. the above-mentioned six coordinates are modified, in order to determine a modified camera parameters configuration—i.e., a set of six coordinates that identify a point of the six dimensional space—that corresponds (or approximates) a local maximum of the similarity score with the query image 217. In other words, the starting search point based on camera parameters configuration of the most similar 3D image 219 is modified in order to obtain the modified camera parameters configuration, which combined with the cloud of points of the 3D model of the environment would generate the additional 3D image 221 substantially corresponding to the query image 217.

This result may be achieved by implementing a maximum search sub-procedure comprising for example a tree approach and/or an operational research algorithm (e.g., as described in Stephen Boyd, Arpita Ghosh, and Alessandro Magnani "Branch and Bound Methods", Notes for EE392o, Stanford University, 2003, and Lionel Lobjois, Michel Lemaitre "Branch and Bound Algorithm Selection by Performance Prediction", AAAI-98 Proceedings, ONERA-CERT/DCSD-ENSAE, 1998).

In an alternative embodiment of the invention, the IRB sub-system 130 may be configure for stopping the maximum search sub-procedure before finding the local maximum of the similarity score with the query image 217. For example, the IRB sub-system 130 may be configure for stopping the sub-procedure upon reaching a predetermined target threshold of the similarity score with the query image 217 (e.g., a target threshold value comprised between 5 and 7). This allows to reduce a total time required for performing the generation of the additional 3D image 221 at the same time ensuring a reliable matching between the query image 217 and the additional 3D image 221.

Different operations are then performed depending on whether the image processing module 210 finds the modified camera parameters configuration corresponding to a local maximum of the similarity score or not (decision block 324).

If the modified camera parameters configuration corresponding to a local maximum of the similarity score is not found (exit branch N of the decision block 324), the image processing module 210 further checks (decision block 327) whether the whole similar 3D images subset 313 of selected 3D images 219 has been analyzed.

In the affirmative case (exit branch Y of the decision block 327); i.e., the whole similar 3D images subset 313 of selected 3D images 219 has been analyzed, the image processing module 210 concludes that is not possible to generate an additional 3D image 221 related to the query image 217. Therefore, operation proceeds to block 312 wherein the IRB positioning of the UE 110 is performed (by the image photogrammetry module 225) by using the identified most similar 3D image 219 previously determined (even if the similarity score of such identified most similar 3D image 219 is lower than the confidence threshold).

In the negative case (exit branch N of the decision block 327); i.e., the whole similar 3D images subset 313 of selected 3D images 219 has not yet been analyzed, a next selected 3D image 219 of the similar 3D images subset 313 is selected for being analyzed (block 330) by the image generation module 230 and a new starting search point is built on the basis thereof, by returning to block 318.

Preferably, the next selected 3D image 219 of the similar 3D images subset 313 selected for being processed is the image having a second highest similarity score (e.g., determined on the basis of the validation geometry check or, whether not available, on the global descriptor fast screening mentioned above) within the set of selected 3D images 219. In other words, the selected 3D images 219 in the similar 3D images subset 313 are ranked in decreasing similarity scores.

Back to decision block 324, if the modified camera parameters configuration corresponding to a local maximum of the similarity score is found (exit branch Y of the decision block 324), a corresponding additional 3D image 221 is generated (block 333) on the basis of the modified camera parameters configuration corresponding to such local maximum of the similarity score. In other words, the additional 3D image 221 is generated from the three-dimensional model of the environment as seen by a modified virtual camera having the modified camera parameters.

The camera parameters configuration corresponding to such local maximum of the similarity score are combined with the clouds of points of the 3D model in order to obtain the additional 3D image 221. In other words the additional 3D image 221 is generated by projecting the cloud of points on the synthetic plane according to the modified camera parameters configuration corresponding to (or approximating) such local maximum of the similarity score.

The additional 3D image 221 just generated is then stored (block 336) in the images DB 205 of the IRB subsystem 130.

Advantageously, the IRB positioning of the UE 110 may then be performed (by the photogrammetric module 225 as described above) by using the additional 3D image 221 just generated that actually has the highest similarity score with the query image 217 provided by the UE 110.

Alternatively, whether the image generation module 230 has a limited computation capability, i.e. a computation capability not sufficient for generating in real-time, or near real-time, the additional 3D image 221, the photogrammetry module 225 performs the IRB positioning of the UE 110 on the basis of the most similar selected image 219, while the additional 3D image 221 is generated in background by the image generation module 230 and stored in the images DB 205 thus available for following IRB positioning procedures.

It should be noted that the procedure described above applies indifferently exploiting as starting search point similarity scores either defined by validation geometry checks or global descriptors.

Particularly, similarity scores defined by global descriptors may be used as starting search points when the validation geometric check yields a low similarity score (for example, lower than, or equal to, 2) between the 3D images 219 and the query image 217

Although in principle similarity scores defined on the basis of local descriptors could be used, they are less reliable than similarity scores defined on the basis of validation geometric checks, thus, using similarity scores defined on the basis of local descriptors, it may happen that a larger number of selected 3D images 219 are selected in the set 307 of selected 3D images 219 to build the similar 3D images subset 313 with respect to the case of similarity scores based on validation geometric checks. Nevertheless, if the sub-procedure for finding the local maximum of the similarity score with the query image 217 determines a sufficiently high value (e.g., a value equal to, or greater than, the target threshold mentioned above) the resulting additional 3D image 221 should be considered a reliable match of the query image 217.

In addition, the procedure according to the present invention may also be applied when the accuracy of an estimated position of the UE 110 obtained, for example, by using collinearity equations (as described in Editor in Chief C. Mc Glone "Manual of Photogrammetry" 5th edition ASPRS, p 280-281) is not sufficient (e.g., a positioning error greater than 30/50 cm), which may occur in case key points in the query image 217 are far from the camera of the UE 110 and concentrated in a limited region of the query image 217.

Regardless the manner in which the similarity scores are computed, it should be noted that general low similarity scores for the 3D images, are an indication that the image DB 205 provide a possible different perspective of the environment (i.e., the environment as seen by the synthetic camera associated with the 3D images 219 of the image DB 205) with respect to a perspective associated with the query image 217 (due to different respective camera parameters configurations). Moreover, in general, low similarity scores of 3D images of the database may be associated with 3D images generated based on a 3D model afflicted by 'ambient noise' (e.g., presence of people and/or vehicles, different lightning conditions during the TLS). Therefore, the image DB 205 could be improved ('strengthen') by storing additional 3D images 221 according to the present invention. Indeed, the additional 3D images 221 generated by the image generation module 230 during each iteration of the procedure, progressively increase the coverage of the environment and increase chances of finding higher similarity scores in subsequent IRB positioning procedures.

In one embodiment of the invention, a DOP (Dilution Of Precision) given by a variance-covariance matrix elements (i.e., coordinates of the 3D images 219 and of the query image 217) could be considered as a parameter that triggers the search procedure of the additional 3D image 221 to be added to the images DB 205 (i.e., the confidence threshold mentioned above could be based on the DOP). Indeed, the DOP (which is a result of the least squares algorithm solution of the collinearity equations, e.g. as described in Editor in Chief C. Mc Glone "Manual of Photogrammetry" 5th edition ASPRS, p 280-281) provides an indication of the accuracy of the camera parameters associated with a selected 3D image 219.

It should be noted that, a selected 3D image 219 having a high similarity score with respect to the query image 217 corresponds to a low DOP (i.e., a better spatial distribution of key points is detected in the matching procedure between the query image and the additional image 221) and thus leading to more accurate estimation of external orientation parameters exploited for the positioning of the UE 110 that provides the query image 217.

According to a different embodiment of the present invention, the positioning procedure may be implemented at least in part directly at the UE 110 (i.e., the image processing module 210 is at least partially implemented in the UE 110) which position is to be determined.

For example, the procedure may be executed by providing the UE 110 with a (possibly also partial) 3D model (e.g., the UE 110 may download the 3D model from the IRB subsystem 130 via the cellular communication network and/or the WLAN) of the environment area (which may be roughly determined by the system 100; e.g., by identifying the radio base station 115 of the cellular communication network and/or the wireless access point 120 of the WLAN to which the UE 110 is connected) and a downloaded set of 3D images 219 of the images DB 205 referred to the environment area.

The downloaded set of 3D images 219 of the images DB 205 may be considered a "basic" or "reduced" data base; i.e., a data base with a low number of 3D images 219 (e.g., 3D images 219 acquired at a physical distances one from the other in the order of meters, such as for example a physical distance comprised between 2-3 m for indoor environments, in order to maintain low a size—e.g., in terms of bytes transmitted—of the downloaded set of 3D images 219).

Advantageously, the procedure may be implemented even if the 3D images 219 of the downloaded set have, for example, a high level perspective coverage, i.e. the 3D images 219 shows the environment as seen from a greater distance than the environment as shown by the query image 219 (due to different respective camera parameters configurations associated with the 3D images 219 and the query image 217).

Such high level perspective coverage of the 3D images 219 implies a low similarity score (for example, a similarity score equal to, or lower than, 4) with respect to the query image 217, nonetheless thanks to the procedure according to the present invention, starting from a downloaded set of 3D images 219 of the images DB 205 and from the 3D model, an additional 3D image 221 with good similarity with the query image 217 can be generated (possibly in real-time) at the UE 110.

In another embodiment of the invention the IRB positioning is performed without exploiting the image DB 205. A 3D image is estimated by projecting the 3D cloud of points according to camera parameters based on a rough positioning of the UE 110.

A starting search point may be determined by means of a different positioning functionality of the system 100. For example, spatial coordinates of the UE 110 may be obtained through an initial rough positioning of the UE 110 based on coordinates of one or more access gateways, such as the access gateway 120 of the Wi-Fi network, within a signal range of the UE 110. In addition or alternative, an initial rough positioning of the UE 110 may be also provided by analysis of signals exchanged by the UE 110 with the radio base station 115 of the mobile communication network and/or or even by a GNSS.

An orientation of the UE 110 may be identified by means of a spatial orientation measurer, such as for example a magnetometer, equipped in the UE 110. In other words, the starting point may be defined by the coordinates of the access gateway 120 in range and by the orientation information provided by the magnetometer of the UE 110.

In this case, a 'custom' 3D image may be generated directly by the UE 110 by downloading only the 3D model of the environment without the need of any 3D images 219 of the images DB 205 (thus avoiding to implement images comparison procedures at the UE 110).

The custom 3D image is generated by projecting the cloud of points on the synthetic plane according to the spatial information of the starting search point previously determined.

Then by examining the six dimensional space, starting from the starting search point which is modified in order to identify a point that defines a camera parameters configuration corresponding to a local maximum (or a value equal to, or greater than, a target threshold) of the similarity score from a similarity score of custom 3D image with respect to the query image acquired by the same UE 110.

Advantageously, the IRB positioning may be then carried out at the UE 110 exploiting external orientation parameters obtained based on the resolution of the collinearity equation where the key points of the query image 217 are associated with the spatial information of an additional image generated based on the modified camera parameters configuration corresponding to a local maximum of the similarity score (e.g., as described in Ghinamo Giorgio, Corbi Cecilia, Francini Gianluca, Lepsoy Skjalg, Lovisolo Piero, Lingua Andrea, and Aicardi Irene, "The MPEG7 Visual Search Solution for Image Recognition Based Positioning Using 3D Models", Proceedings of the 27th International Technical Meeting of The Satellite Division of the Institute of Navigation (ION GNSS+ 2014), Tampa, Fla., September 2014, pp. 2078-2088.

Furthermore, in an embodiment of the invention, a procedure for generating additional 3D images 221 similar to what described above may also be executed offline (i.e., without interacting with any UE 110) in order to train the IRB positioning subsystem 130 and particularly the images DB 205 to practical condition of use.

In this case, in order to improve an images DB 205 having an unsatisfactory starting set of 3D images 219 (e.g., a low number of 3D images 219 and/or acquired at substantial distances one from the other with respect to an extension of the environment area), a set of 'training images' with no spatial information available (i.e., simple digital images, simulating query images 217) may be provided.

By applying a procedure substantially equal to procedure described above, starting from the training images, additional 3D images 221 may be generated, which may improve the images DB 205 increasing the number of 3D images thereof thereby allowing a more effective IRB positioning.

The invention claimed is:

1. A method of positioning a user equipment located in an environment, the user equipment comprising a camera for acquiring digital images, the method comprising:
    defining a three-dimensional model of the environment through a cloud of points, each point being defined by a set of coordinates and a color information;
    having the user equipment acquire a query image by capturing, by the camera, a portion of the environment;
    estimating an initial camera parameters configuration of the camera of the user equipment;
    evaluating similarities between the query image and each of a plurality of three-dimensional images to determine an initial three-dimensional image, the initial three-dimensional image being obtained from the three-dimensional model of the environment as seen by a virtual camera having said initial camera parameters configuration;
    modifying a camera parameters configuration of the virtual camera associated with the initial three-dimensional image to increase a similarity between the initial three-dimensional image and the query image up to a predetermined value; and
    generating an additional three-dimensional image based on the three-dimensional model of the environment, the additional three-dimensional image being obtained from the three-dimensional model of the environment as seen by a modified virtual camera having the modified camera parameters configuration.

2. The method according to claim 1, wherein the estimating an initial camera parameters configuration of the camera of the user equipment comprises:
    evaluating a similarity between the query image and the plurality of three-dimensional images which are stored in a database of images, each three-dimensional image of the plurality of three-dimensional images being generated based on the three-dimensional model of the environment as seen by a respective virtual camera having a respective camera parameters configuration,
    identifying a most similar three-dimensional image of the database of images among the three-dimensional images in a database of images; and
    wherein the estimating an initial camera parameters configuration of the camera of the user equipment comprises:
    estimating the initial camera parameters configuration of the camera of the user equipment based on the respective camera parameters configuration of the respective virtual camera associated with the most similar three-dimensional image, and
    exploiting the most similar three-dimensional image as the initial three-dimensional image.

3. The method according to claim 2, wherein the identifying a most similar three-dimensional image of the database of images among the three-dimensional images in a database of images comprises:
    extracting local descriptors from the query image and from the three-dimensional images comprised in the database of images;
    for the query image and for each one of the three-dimensional images comprised in the database of images:
        selecting local descriptors having highest statistical characteristic values among all the local descriptors, and obtaining global descriptors as a statistical representation of a set local descriptors having the highest statistical characteristic values among all the local descriptors;

evaluating a global descriptors similarity score between each three-dimensional images comprised in the database of images and the query image; and selecting a set of three-dimensional images having at least a minimum predetermined global descriptors similarity score.

4. The method according to claim 3, wherein the identifying a most similar three-dimensional image of the database of images among the three-dimensional images comprised in a database of images further comprises:

identifying as the most similar three-dimensional image of the database of images among the three-dimensional images comprised in a database of images the three-dimensional image of the set having the highest global descriptors similarity score.

5. The method according to claim 3, wherein the identifying as the most similar three-dimensional image of the database of images among the three-dimensional images comprised in a database of images the three-dimensional image of the set having the highest global descriptors similarity score comprises:

extracting key points from the query image and from the three-dimensional images comprised in the set;

searching matches between the key points of the query image and key points of each of the three-dimensional images comprised in the set;

identifying as the most similar three-dimensional image of the database of images among the three-dimensional images comprised in set, the three-dimensional image of the set having the highest number of matching key points.

6. The method according to claim 5, wherein the extracting key points from the query image and from the three-dimensional images comprised in the set comprises:

for each key point, identifying a respective set of coordinates indicating a position of the key point within the three-dimensional model of the environment.

7. The method according to claim 1, wherein the user equipment is arranged for exchanging signals with a data network, and wherein the estimating an initial camera parameters configuration of the camera of the user equipment estimating comprises:

exploiting the signals exchanged between the user equipment and the data network for estimating the initial camera parameters configuration of the camera of the user equipment.

8. The method according to claim 1, wherein the estimating an initial camera parameters configuration of the camera of the user equipment estimating comprises:

exploiting a Global Navigation Satellite System for estimating the initial camera parameters configuration of the camera of the user equipment.

9. The method according to claim 1, wherein the modifying a camera parameters configuration of the virtual camera associated with the initial three-dimensional image to increase the similarity between the initial three-dimensional image and the query image up to a predetermined value comprises:

searching the modified camera parameters configuration that corresponds to a local maximum of a similarity score with the query image.

10. The method according to claim 9, wherein the searching the modified camera parameters configuration that corresponds to a local maximum of the similarity score with the query image comprises:

stopping the search when a modified camera parameters configuration that corresponds to a similarity score with the query image equal to, or greater than, a predetermined target threshold of the similarity score with the query image is found.

11. The method according to claim 1, further comprising performing the positioning of the user equipment based on the additional three-dimensional image.

12. The method according to claim 1, further comprising:

performing the positioning of the user equipment based on a most similar three-dimensional image of a database of images while:

modifying a camera parameters configuration of the virtual camera associated with the initial three-dimensional image to increase the similarity between the initial three-dimensional image and the query image up to a predetermined value; and generating an additional three-dimensional image based on the three-dimensional model of the environment, the additional three-dimensional image being obtained from the three-dimensional model of the environment as seen by a modified virtual camera having the modified camera parameters configuration.

13. The method according to claim 1, further comprising:

storing the additional three-dimensional image in a database of images, each three-dimensional image being generated based on three-dimensional model of the environment as seen by a respective virtual camera having a respective camera parameters configuration.

14. A system for positioning a user equipment located in an environment, the user equipment comprising a camera for acquiring digital images, the system comprising:

an Image Recognition Based positioning subsystem arranged for receiving at least a query image from the user equipment and for identifying the position of the user equipment by performing the method according to claim 1.

15. The system according to claim 14, wherein the Image Recognition Based positioning subsystem comprises:

a communication module configured to provide and manage communications between the user equipment and the Image Recognition Based positioning subsystem; and a storage element storing a three-dimensional model of the environment through a cloud of points, each point being defined by a set of coordinates and a color information.

16. The system according to claim 15, wherein the Image Recognition Based positioning subsystem further comprises:

an images database storing a plurality of three-dimensional images, each three-dimensional image being generated based on three-dimensional model of the environment as seen by a respective virtual camera having a respective camera parameters configuration;

a visual search module arranged for comparing three-dimensional images comprised in the images database with the query image provided by the user equipment;

a photogrammetry module arranged for estimating a position of the user equipment that provided the query image based on at least one three-dimensional image; and an image generation module configured to generate an additional three-dimensional image to be added to the images database by processing query image and three-dimensional images.

\* \* \* \* \*